US012221345B2

(12) United States Patent
Klose et al.

(10) Patent No.: US 12,221,345 B2
(45) Date of Patent: Feb. 11, 2025

(54) PROCESS FOR THE PREPARATION OF A POROUS CARBONACEOUS MATERIAL, POROUS CARBONACEOUS MATERIAL, AND A CATALYST MADE OF THE MATERIAL

(71) Applicant: Heraeus Battery Technology GmbH, Hanau (DE)

(72) Inventors: Markus Klose, Hanau (DE); Stephan Osinga, Hanau (DE); Julie Michaud-Bernlochner, Hanau (DE); Dominik Samuelis, Hanau (DE); Jörg Becker, Hanau (DE); Thomas Hucke, Hanau (DE); Benjamin Krüner, Hanau (DE); Evgeniia Komarova, Hanau (DE)

(73) Assignee: HERAEUS BATTERY TECHNOLOGY GMBH, Hanau (DE)

( * ) Notice: Subject to any disclaimer, the term of this patent is extended or adjusted under 35 U.S.C. 154(b) by 629 days.

(21) Appl. No.: 17/436,854

(22) PCT Filed: Mar. 19, 2020

(86) PCT No.: PCT/EP2020/057622
§ 371 (c)(1),
(2) Date: Sep. 7, 2021

(87) PCT Pub. No.: WO2020/200812
PCT Pub. Date: Oct. 8, 2020

(65) Prior Publication Data
US 2022/0177309 A1    Jun. 9, 2022

(30) Foreign Application Priority Data
Apr. 2, 2019 (EP) .................................. 19166727

(51) Int. Cl.
*C01B 32/05* (2017.01)
(52) U.S. Cl.
CPC .......... *C01B 32/05* (2017.08); *C01P 2004/64* (2013.01); *C01P 2006/10* (2013.01); *C01P 2006/14* (2013.01); *C01P 2006/16* (2013.01)
(58) Field of Classification Search
CPC ......... C01B 32/05; C01B 32/15; C01B 32/00; C01P 2004/64; C01P 2006/10; C01P 2006/14; C01P 2006/16; C01P 2004/60; C01P 2006/17; C04B 2111/0081; C04B 2235/6562; C04B 2235/661; C04B 2235/77; C04B 38/009; C04B 35/524; H01G 11/24; H01G 11/34; B01J 20/20; B01J 20/28042; B01J 20/28057; B01J 20/28069; B01J 20/28085; B01J 21/18; B01J 35/615; B01J 35/617; B01J 35/635; B01J 35/638; B01J 35/651
See application file for complete search history.

(56) References Cited

U.S. PATENT DOCUMENTS

| | | | |
|---|---|---|---|
| 8,227,518 B2 | 7/2012 | Tennison et al. | |
| 2008/0152577 A1 | 6/2008 | Addiego et al. | |
| 2011/0237691 A1* | 9/2011 | Tennison | .............. C04B 38/009 521/61 |
| 2015/0284252 A1 | 10/2015 | Karthik et al. | |
| 2015/0357637 A1 | 12/2015 | Yamanoi et al. | |
| 2016/0102187 A1 | 4/2016 | Leventis et al. | |
| 2017/0174578 A1 | 6/2017 | Belcher et al. | |

FOREIGN PATENT DOCUMENTS

| | | | |
|---|---|---|---|
| CN | 105122519 A | 12/2015 | |
| CN | 105621383 A | 6/2016 | |
| EP | 2921468 * | 9/2015 | ............. C04B 35/52 |
| EP | 3476817 * | 5/2019 | ........... C04B 35/524 |
| JP | S50-116392 A | 9/1975 | |
| JP | 2000223124 A | 8/2000 | |
| JP | 2012-527397 A | 11/2012 | |

(Continued)

OTHER PUBLICATIONS

US Trademark Serial No. 98195578 (Year: 2024).*
Office Action issued Aug. 8, 2023 in CN Application No. 202080016177. 4, with partial English translation.
International Search Report and Written Opinion mailed Jul. 20, 2020 by the European Patent Office for corresponding International Patent Application No. PCT/EP2020/057622.
Kimbery M. Nelson et al: "Preparation and CO2 adsorption properties of soft-templated mesoporous carbons derived from chestnut tannin precursors", Microporous and Mesoporous Materials 222 (2016) pp. 94-103.

(Continued)

*Primary Examiner* — Daniel C. McCracken
(74) *Attorney, Agent, or Firm* — Panitch Schwarze Belisario & Nadel LLP

(57) ABSTRACT

Known processes for preparing a porous carbonaceous material require lengthy polymerization and washing steps involving solvents or neutralizing agents. The use of high quantities of pore formers leads to a lower carbon yield and higher costs, and use of sulphuric acid leads to sulphur contamination of the final material, but also to corrosion and corrosive by-products and a more complicated handling of the process. In order allows the manufacturing of a porous carbonaceous material with a high pore volume and avoiding the disadvantages of the known methods, a process is provide that comprise the steps of a) providing at least one carbon source and at least one amphiphilic species, b) combining at least the carbon source and the amphiphilic species to obtain a precursor material, c) heating the precursor material to a temperature in the range between 300° C. and 600° C. for at least 15 min so as to obtain a porous carbonaceous material, which is then cooled so as to form the porous carbonaceous material having a modal pore size and a pore volume and a skeleton density.

19 Claims, 4 Drawing Sheets

(56) References Cited

FOREIGN PATENT DOCUMENTS

WO    2007131951  A2    11/2007
WO    2010135389  A2    11/2010

OTHER PUBLICATIONS

Mitome Takahito et al: "Porous structure and pore size control of mesoporous carbons using a combination of a soft-templating method and a solvent evaporation technique", Colloids and Surfaces A: Physicochemical and Engineering Aspects 494 (2016) pp. 180-185.
Wannes Libbrecht et al: "Tunable Large Pore Mesoporous Carbons for the Enhanced Adsorption of Humic Acid", Langmuir (2017) 33, pp. 6769-6777.
Yan Meng et al: "A Family of Highly Ordered Mesoporous Polymer Resin and Carbon Structures from Organic-Organic Self-Assembly", American Chemical Society (2006) 18, pp. 4447-4464.

* cited by examiner

PROCESS FOR THE PREPARATION OF A POROUS CARBONACEOUS MATERIAL, POROUS CARBONACEOUS MATERIAL, AND A CATALYST MADE OF THE MATERIAL

CROSS-REFERENCE TO RELATED APPLICATIONS

This application is a U.S. national phase application of International Patent Application No. PCT/EP2020/057622 filed on Mar. 19, 2020, that claims priority to European Patent Application No. 19166727.8 filed on Apr. 2, 2019, the entirety of which are incorporated herein by reference.

FIELD OF THE INVENTION

The present invention relates to a process for the preparation of a porous carbonaceous material.

The invention further relates to a porous carbonaceous material and to a catalyst comprising a catalyst support having a surface area on which metal particles are distributed.

In addition, the invention refers to a process for gas absorption comprising contacting a gas comprising at least one component with an absorbent material which selectively absorbs the at least one component.

Porous carbonaceous material is used for example in electrodes for fuel cells, supercapacitors, electric accumulators (secondary batteries) and as absorbent for liquids and gases, as storage medium for gases, as carrier material in chromatographic applications or catalytic processes and as a material used in medical technology or in mechanical engineering, e.g. as light-weight material for aerospace applications.

PRIOR ART

Components of porous carbon foam have been known for a long time. This foam is obtained by heating organic start substances to temperatures between 1000-1500° C. under inert gas. According to an approach disclosed in US 2015/0284252 A1 carbon foam with graphitic nature and a bimodal structure with macropores and ordered mesopores is obtained via a polymerization type process.

In the process of US 2015/0284252 A1 a polymeric foam (e.g. polyurethane, polystyrene, polyethylene or polypropylene) is used as sacrificial template or scaffold, which provides a three-dimensional interconnected macroporous architecture with large voids and interfaces. This template is being impregnated with a mixture of phenol or (substituted phenol including also resorcinol and Novolac resins) and aldehyde (for crosslinking and forming a resin), a poly (alkylene oxide)—specifically Pluronic F127, P123 and F108, an organic solvent and water. The impregnated template is then treated in an autoclave hydrothermally for 1-4 days. During heating, a self-assembly is induced by evaporation.

The obtained carbon foam has a high degree of graphitization when the material is treated to only 1.000° C., whereas most carbon materials would need treatment temperatures above 2.000° C.

Another process that avoids a long-time evaporation step is suggested in U.S. Pat. No. 8,227,518 B2. The method involves a phenol-formaldehyde resin and ethylene glycol as a pore-former and a catalyst or cross-linking agent. The mixture is partially cross-linked and then poured into hot oil at 102° C. to complete the cross-linking step and create mesoporous beads. The cross-linked resin beads are then washed and can directly be carbonized to produce mesoporous carbon beads. The pore structure of the final carbon material is already present in the cross-linked porous resin. The reported pore volumes are in the range of about 0.2 and 1.0 $cm^3/g$.

In more details, the described process includes the use of a Novolac phenol-formaldehyde resin and the pore former used as a solvent. The process is carried out in solution (pore former as solvent) where the mixture containing Novolac with modifying agents (if required), cross-linking agents and catalysts (if required) and the pore former, is heated to start the cross-linking reaction to produce a solid resin. The porous resin can be a monolith or milled to a powder (particle sizes between 1-1.000 μm). The resin powder can be carbonized to give a porous carbon with a pore size in the mesopores and macropore range.

One important step is a washing step to remove the pore former. The washing is done at low temperature via water or vacuum distillation and may include a neutralization step. The carbonization process begins at 400° C. and mostly is completed by 700° C. The surface area though begins to increase at temperatures above 600° C. A significant conductivity of the material is measured for materials treated above 700° C.

The carbon materials are being advantageous for applications where high physical strength and high attrition resistance are required, such as liquid phase catalyst supports, blood filtration, applications where the carbon is used in a fluid bed, applications in drug delivery or chiral supports.

Takahito Mitomea, Yuichiro Hirota, Yoshiaki Uchida, Norikazu Nishiyama in: "Porous structure and pore size control of mesoporous carbons using a combination of a soft-templating method and a solvent evaporation technique"; Colloids and Surfaces A: Physicochem. Eng. Aspects 494 (2016) 180-185, doi:10.1016/j.colsurfa.2016.01.009; describe mesoporous carbons prepared through self-assembly process of a composite of triblock copolymer and resorcinol—formaldehyde resin. Typically, resorcinol is dissolved in a water/ethanol mixture and then the three-block copolymer Pluronic F127 is added and stirred. After complete dissolution of resorcinol and Pluronic F127 and evaporation of the solvent at room temperature, the product is heated at 90° C. for 96 h, and the resulting composite is carbonized under a nitrogen atmosphere at 400° C. for 3 h at a heating rate of 1.3° C./min, followed by further carbonization at 800° C. for 3 h at a heating rate of 1.7° C./min. The pore size of the carbon material thus obtained is adjustable in the range from 6.8 nm to 56 nm.

Wannes Libbrecht, An Verberckmoes, Joris W. Thybaut, Pascal Van Der Voort, Jeriffa De Clercq in: "Tunable Large Pore Mesoporous Carbons for the Enhanced Adsorption of Humic Acid"; Langmuir, vol. 33, no. 27, 28 (June 2017); 6769-6777;

doi:10.1021/acs.langmuir.7b01099; describe a process for the production of mesoporous carbon by the soft template method. Resorcinol and different amounts of F127 (Sigma-Aldrich) are dissolved in ethanol and HCl. After homogenization, ethanol is evaporated at room temperature and then the material is cured in a muffle furnace at 60° C. for 12 h. The cured resin is calcined under nitrogen in a tube furnace and carbonized. In a first heating step with a heating rate of 1 C/min to 350° C. (holding time 2 h) the surfactant is removed. In a second heating step, the material is heated to temperatures of 400, 800 or 1200° C. at a heating rate of 2°

C./min (holding time 3 h) for further carbonization. The carbon monolith is then crushed and screened through a 150 mesh filter. The pore size of the carbon material thus obtained varies and is in the range of 4 to 40 nm.

Kimberly M. Nelson, Shannon M. Mahurin, Richard T. Mayes, Ben Williamson, Craig M. Teague, Andrew J. Binder, Loic Baggetto, Gabriel M. Veith, Sheng Dai in: "Preparation and $CO_2$ adsorption properties of soft-templated mesoporous carbons derived from chestnut tannin precursors"; Microporous and Mesoporous Materials 222 (2016) 94-103, doi:10.1016/j.micromeso.2015.09.050; describe soft templating approach for mesoporous carbon using the polyphenolic heterogeneous biomass, chestnut tannin, as the carbon precursor. Mesoporous carbons were synthesized by in-situ self-assembly of chestnut tannin extract and Pluronic F127, the structure directing agent, in acidic ethanol. The solution was cast on a petri dish to evaporate the solvent overnight and subsequently transferred to an oven for curing at 80° C. for 24 h. The samples were then carbonized at 600° C. for 2 h with a ramp rate of 5° C./min.

US 2016/102187 A1 describes porous polyamide aerogels which are prepared from monomers having increased levels of aromatic content per functional group compared to conventional polyamides.

TECHNICAL OBJECTIVE

The process known from US 2015/0284252 A1 results in carbon foam. Generally, carbon foam is distinguished by an extremely low density of less than 0.1 g/cm³ and by a high temperature resistance under inert gas. Typical minimal pore sizes are however around 50 μm; for many applications, however, pores are needed in the nanometer range, as well as large specific surface areas that cannot be obtained with this material. The use a polymeric foam as a template material reduces the overall yield of the process and requires large volumes in the reaction vessel. It requires a lengthy hydrothermal treatment in an autoclave for performing a self-assembly step.

The process of U.S. Pat. No. 8,227,518 B2 includes a multi-step process where the mixture is partially crosslinked, then either cast into a block to form a monolith or dropped into oil to form beads which then need to be washed prior to further processing. Polymerization step is lengthy and washing step involves solvents or neutralizing agents. The use of high quantities of pore formers leads to a lower carbon yield and higher costs, and use of sulphuric acid leads to sulphur contamination of the final material, but also to corrosion and corrosive by-products and a more complicated handling of the process.

It is an object of the invention to provide a process that allows the manufacturing of a porous carbonaceous material with a high pore volume but which avoids the disadvantages of the known methods.

It is a further object of the invention to provide a porous carbon material which provides advantages for further processing, especially in which the required energy for comminution is decreased.

It is another object of the invention to provide an inexpensive electrochemical energy storage device and an inexpensive catalyst carrier.

SUMMARY OF THE INVENTION

A contribution to achieving at least one of the above objects is made by the independent claims. The dependent claims provide preferred embodiments of the present invention which also serve to solve at least one of the above-mentioned objects.

According of the invention the process for the preparation of a porous carbonaceous material comprises:
a) providing at least one carbon source and at least one amphiphilic species,
b) combining at least the carbon source and the amphiphilic species to obtain a precursor material,
c) heating the precursor material to a temperature in the range between 300° C. and 600° C. for at least 15 min so as to obtain the porous carbonaceous material, and
d) cooling the porous carbonaceous material having a mean pore size and a pore volume and a skeleton density,
e) comminuting the porous carbonaceous material so as to obtain crushed porous carbonaceous material particles, and
f) heating the crushed porous carbonaceous material particles to a temperature in the range from 700-1500° C.

The method for producing a porous carbonaceous material uses a soft-template approach. The amphiphilic species serves to direct the formation of a three-dimensional structure from the carbon source during heating step c). Carbon atoms contained in the amphiphilic species become part of the final macroporous carbon material; a template material is not required for that process. This makes the process cheaper and easier to scale.

The mixture is treated at a temperature in the range of 300 to 600° C., preferably to a temperature in the range between 350 to 550° C., and even more preferred between 450 and 550° C. to produce the porous carbonaceous material.

By heating the precursor material to a temperature in the range between 300° C. and 600° C. for at least 15 min the self-assembly process starts and the carbon source crosslinks and/or solidifies. Preferably the self-assembly process is finished before the point where the carbon precursor has crosslinked and/or solidified. The amphiphilic species decompose at specific temperatures, e.g. beginning at 170° C. or 280 to 320° C., so that the amphiphilic molecules are partly or completely decomposed. The decomposition of amphiphilic molecules leaves interconnected voids that contributes to the macroporosity of the resulting carbon material. The treatment at heating temperatures below 600° C. is lower than complete carbonization or even graphitization occurs so that porous carbonaceous material with the desired pore structure and with a low skeletal density is obtained.

After cooling to low temperature, especially below 50° C., preferably below 40° C., and usually to room temperature, a porous carbonaceous material is obtained that is characterized by low skeletal density, high porosity and low weight. The porous carbonaceous material comprises macropores including open interconnected pores and it has preferably a skeletal density in the range form 1.2 g/cm³ to 1.8 g/cm³, preferably from 1.3 g/cm³ to 1.7 g/cm³. The obtained material already exhibits a porosity that is suitable for a number of different applications including gas sorption for example.

It is an advantage of the process that the carbonaceous material can be synthesized at temperatures between 300° C. and 600° C. which are achievable with simple oven technologies, giving a cost reduction in processing. According to the invention a porous carbonaceous material is synthesized which is not completely carbonized nor graphitized. It can subsequently be processed and/or modified in a number of different ways; and its manufacturing process is less cost intensive.

The synthesis step to low temperatures up to 600° C. already allows for the release of the majority of the off gases and therefore the remaining material can be processed faster in subsequent steps, e.g. the further thermal treatment due to its reduced mass, which can lead to an increased throughput for those steps. Furthermore, for carbonaceous materials that have been synthesized using temperatures 600° C. and lower, a higher content of oxygen-containing functional groups at the surface of the material will be present than for comparable materials that have been treated to higher temperatures. This is beneficial for the attachment of additional functionalities compared to other carbons or carbonaceous materials that exhibit less of such oxygen-containing functional groups. Also, a lower final temperature during synthesis will notably decrease the energy consumption if the heating step and will also require less time to reach that temperature.

It can be summarized that the inventive approach allows for the synthesis of a carbonaceous, porous material with a tunable macroporosity and a low skeletal density. In its simplest form, the synthesis only requires the carbon source and the amphiphilic molecule, but no crosslinking agent, no solvent, no hot oil bath, in order to yield the described material. The "pore former" is generated from the amphiphilic species during the low temperature heating process and pure carbon remains, which forms part of the carbonaceous product. Therefore, no pore former must be removed by a costly process. The synthesis can be done at temperatures as low as 400° C. within a short time scale and does not require days to be completed. Also, an oven that can be inertized is already sufficient for the process, no autoclave for a solvothermal or hydrothermal treatment is required in contrast to what is described in the prior art.

The carbon source is preferably a Novolac type phenolic formaldehyde resin, especially a Novolac type resorcinol-formaldehyde resin or in the alternative Novolac type phenol-formaldehyde resins, or a hydrolysable tannic acid, lignin or cellulose resins. The carbon source is a single material or it contains a mixture of two or more carbon source materials The amphiphilic molecule is preferably a block co-polymer and/or a surfactant. Most preferably the block-copolymer is selected from the group consisting of triblock copolymers with the structure polyoxyethylene-polyoxypropylene-polyoxyethylene or polyoxypropylene-polyoxyethylene-polyoxypropylene, emulsifiers such as polyethylene-polypropylene glycol, surfactants such as polyethylene glycol monoalkyl ether and other modified polyethylene glycols If the constituents of the precursor are liquid or pasty, the carbonaceous material can be obtained as a monolith by pouring the precursor material on a surface or into a casting mold. So, it is possible to produce monolithic bodies of the herein described carbonaceous material. The monolith may be a three-dimensional body or a flat layer. In a preferred embodiment the porous carbonaceous material in form of particles or in form of a monolith undergoes further processing. After cooling according to step d) in a subsequent step e) the porous carbonaceous material is comminuted to obtain crushed porous carbonaceous material particles.

Such particles have fractured surfaces often show non-spherical morphology, which is desirable for many applications. The low skeletal density of the porous carbonaceous material provides advantages for processing in which the required energy for comminution is decreased and additional media for such lower-force comminuting processes are available compared to higher-force comminuting processes for high-density carbon materials.

Since the skeletal density of the herein described porous carbonaceous material is low, comminuting, e.g. milling and/or crushing, the material will require less energy input and many more milling media would be available for use.

The approach involved a two-step process where the self-assembly by decomposing of the amphiphile species and crosslinking of the carbon source was done in a first step to produce the carbonaceous material, and after cooling and commination and optionally other pre-treatment, subsequently a carbonization step or other post-treatment may be performed.

The porous carbonaceous material produced by the process of the invention is especially suitable as a precursor material for porous carbon products by using an additional heat treatment under inert conditions In view of this, the crushed porous carbonaceous material particles in a subsequent step f) are heated to a temperature in the range from 700 to 1.500° C.

By applying an additional thermal treatment to above 700° C. under inert gas atmosphere the porous carbonaceous material can be converted into a porous, electrically conductive carbon with a low micropore content but a high inner surface area, which can be used for example in energy storage devices for improved diffusion of the electrolyte.

In a preferred modification of the method the crushed porous carbonaceous material has a medium particles size ($D_{50}$ value) of less than 10 mm, preferably less than 5 mm, and most preferred less than 3 mm.

In a preferred embodiment a crosslinking agent is added to the precursor material in step b). The crosslinking agent is preferably selected from polyamine compounds preferably the crosslinking agent is hexamethylenetetramine.

By adding a crosslinking agent, the porosity and specific density of the carbon material may be tailored.

During crosslinking and pyrolysis of the carbon source (e.g. a phenolic resin) and the amphiphile species occurs. The carbon source decomposes during the heat treatment and forms carbon with a yield in the range typically from 30-50 wt. %. The amphiphile species decomposes almost completely and serves as a pore former, which reduces the total carbon yield of the mixture (e.g. to 15-33 wt. %). The crosslinking and pyrolysis steps are typically carried out in inert atmosphere at atmospheric pressure or slightly below atmospheric pressure. This is because it is to be assumed that an oxidizing atmosphere at high temperatures can lead to carbon burn-off. The crosslinking and pyrolysis steps may also be carried out under low pressure or under vacuum, e.g. an absolute pressure lower than 500 mbar, preferably lower than 300 mbar.

Surprisingly, it was found that the yield (expressed in %) of the carbon in the precursor material can be increased up to about 10% (absolute value) if the heating step c) comprises an oxidation phase in which the precursor material is treated in an atmosphere containing an oxidizing agent. The oxidizing agent may contain oxygen preferably the oxidizing agent comprises at least one of the components of the group consisting of oxygen, carbon dioxide and water. A possible (but not binding) explanation for the higher yield is that oxygen form the oxidizing agent is incorporated into the polymer network. However, the incorporation is not such that the oxygen is removed during further carbonization by leaving the product as CO or $CO_2$, which would reduce the overall carbon yield, but rather that the incorporated oxygen stabilizes the polymer network during crosslinking and this stabilization reduces further carbon loss.

Therefore, in a preferred embodiment the heating of the precursor material in step c) comprises an oxidation phase in which the precursor material is heated in an atmosphere containing an oxidizing agent.

It has been found advantageous if the atmosphere containing an oxidizing agent during heating the precursor material during the oxidation phase may be an containing atmosphere oxygen in molecular form, as $O_2$, preferably an atmosphere with an oxygen content of less than 25% by volume, particularly preferably air.

The "oxidizing effect" of the atmosphere causes an oxidation of the precursor material, especially the oxidation of the carbon source. The intensity (rate) of the oxidation reaction depends on the temperature. At the lower temperature limit mentioned above, the intensity is sufficiently high to avoid long heating times. At the upper temperature limit the atmosphere containing an oxidizing agent is changed and further heating takes place under inert gas. The upper temperature limit can (but does not have to) simultaneously correspond to the "first temperature" for the low temperature treatment.

The heating of the precursor material during the oxidation phase is carried out preferably in a temperature range between 150° C. and 520° C., more preferably between 200° C. and 470° C.

The degree of oxidation also depends on the content of the oxidizing agent, e.g. oxygen in molecular form, in the oxidizing atmosphere and on the duration of the oxidizing phase.

It has proven to be beneficial if the oxidation phase has a duration in the range of 60 to 360 minutes, preferably in the range of 120 to 300 minutes.

With regard to the porous carbon material the above object is solved in that it is a porous carbonaceous material having a low skeletal density in the range from 1.2 g/cm$^3$ to 1.8 g/cm$^3$ and further comprising pores including open interconnected pores.

The low skeletal density of the porous carbonaceous material provides advantages for processing in which the required energy for comminution is decreased and additional media for such lower-force comminuting processes. Such porous carbonaceous material may be obtained according to the process of the present invention as described above.

The porous carbonaceous material is preferably present is form of a monolith or in form of a powder. The interconnected pores are open to the surface of the monolith or to the surface of the powder particles. The open interconnected pores are suitable to transport liquid, gas, molecules, atoms and ions through the monolith or particle.

In a preferred embodiment the porous carbonaceous material has a modal pore size is in the range from 50 to 280 nm, most preferred in combination with a monomodal pore size distribution. An advantage of the modal pore size between 50 and 280 nm is that the ions has a large network of pores where the wall effects are no longer hindering the transport of the ions. Smaller pores are often too small to serve ion transport, and often form pore networks with very high tortuosity. Larger pores can limit the number of pores available, and reduce the mechanical strength of the particle.

The porous carbonaceous material of the invention, including the porous carbonaceous material produced by the invention process, is suitable for all applications where porous carbonaceous material is commonly used. In addition to the applications mentioned above, it is particularly suitable for the manufacture of a separator for electrochemical energy storage devices, as an additive in electrochemical energy storage devices for maintaining an open porosity that allows for improved diffusion of electrolyte through the electrode, as a catalyst support for anchoring metal particles for catalytic applications, as a mechanical filter material especially for the filtration liquids, as storage material for liquids and gases, especially $CO_2$, as a stationary phase in chromatography on which the materials to be separated are selectively absorbed, as thermal insulator under low pressure or under vacuum.

With regard to the additive in an electrochemical energy storage device the above object is solved in that the electrochemical storage device comprises positive and negative electrode layers, said electrode layers being prepared from active material, binders, other carbonaceous materials and the porous carbonaceous material according to the invention. During preparation, the electrode layers are being subjected to compression. The porous carbonaceous material is designed in a mechanically stable way according to the invention, so that the open interconnected pores remain present in the electrode after compression.

With regard to the electrochemical energy storage device the above object is solved in that the electrochemical energy storage device comprises a separator, said separator being prepared from the porous carbonaceous material according to the invention.

With regard to the catalyst the above object is solved in that the catalyst support is made of a porous carbonaceous material according the invention.

The metal particles are made from elemental metal or a metal alloy or form a metal-containing precursor. The metal particles are used to introduce active metal sites for example for catalytic applications. Their distribution on the surface of the carbonaceous porous material ensures that those will be located at the accessible surface within the pores in contrast to approaches where the metal-containing precursor is contained in the initial mixture of starting materials, where it then may be incorporated inside the structure at a location where it might not be accessible.

With regard to the process for gas absorption the above object is solved in that the adsorbent material comprises a porous carbonaceous material according to the invention.

TEST METHODS AND DEFINITIONS

The following test methods are used. In absence of a test method, the ISO test method for the feature to be measured published most recently before the earliest filing date of the present application applies. In absence of distinct measuring conditions, standard ambient temperature and pressure (SATP) as a temperature of 298.15 K (25° C., 77° F.) and an absolute pressure of 100 kPa (14.504 psi, 0.986 atm) apply.

Mercury Porosimetry (Pore Size and Pore Volume)

The specific pore volume for different pore sizes, the cumulative pore volume, and the porosity were measured by mercury porosimetry. In this test, mercury is pressed into the pores of the porous material under the action of an external pressure against the opposing surface tension forces. The force needed is inversely proportional to the pore size and therefore, as well as the cumulative total pore volume, the pore size distribution of the specimen can also be determined.

The mercury porosimetry analysis was performed according to ISO15901-1 (2005). A Thermo Fisher Scientific PASCAL 140 (low pressure up to 4 bar) and a PASCAL 440 (high pressure up to 4000 bar) and SOLID Version 1.6.3 (26 Nov. 2015) software (all from Thermo Fisher Scientific, Inc.) were calibrated with porous glass spheres with a modal pore diameter of 140.2 nm and pore volume of 924.4 mm$^3$/g (ERMFD122 Reference material from BAM). During measurements the pressure was increased or decrease continuously and controlled automatically by the instrument running in the PASCAL mode and speed set to 8 for intrusion and 9 for extrusion. The Washburn method was employed for the evaluation and the density of Hg was corrected for the actual temperature. Value for surface tension was 0.48 N/m and contact angle 140°. Sample size was between about 25 and 80 mg. Before starting a measurement, samples were heated to 150° C. in vacuum for 1 hour.

The mercury porosimetry is suitable for the measurement of relatively large pores (mesopores to macropores). Mesopores means pores with pore sizes in the range between 2 and 50 nm, Macropores means pores with pore sizes larger than 50 nm and micropores means pores with pore sizes of less than 2 nm.

The "modal pore size" is determined via the software. It defines the pore diameter that exhibits the largest value of a log differential pore volume on a diagram in which the log differential pore volume (dV/d (log D), wherein V represents a mercury penetration volume, and D represents a pore diameter) is plotted against the pore diameter measured with a mercury porosimeter, and is based on a volume. The dV/d(log D) curve is the probability density function of the pore size. The "modal pore size" corresponds to the pore size with the greatest abundance. The typical pore diameter range is between 1 nm to 10000 nm.

Gas Adsorption (Total Specific Surface Area ($BET_{total}$) and External Surface Area ($BET_{ext}$))

BET measurements to determine the specific surface area of particles are made in accordance with DIN ISO 9277: 2010. A NOVA 3000 (from Quantachrome) which works according to the SMART method (Sorption Method with Adaptive dosing Rate), is used for the measurement. As reference material Quantachrome Alumina SARM Catalog No. 2001 (13.92 m2/g on multi-point BET method), and SARM Catalog No. 2004 (214.15 $m^2$/g on multi-point BET method) available from Quantachrome are used. Filler rods are added to the reference and sample cuvettes in order to reduce the dead volume. The cuvettes are mounted on the BET apparatus. The saturation vapour pressure of nitrogen gas ($N_2$ 4.0) is determined. A sample is weighed into a glass cuvette in such an amount that the cuvette with the filler rods is completely filled and a minimum of dead volume is created. The sample is kept at 200° C. for 1 hour under vacuum in order to dry it. After cooling the weight of the sample is recorded. The glass cuvette containing the sample is mounted on the measuring apparatus. To degas the sample, it is evacuated at a pumping speed selected so that no material is sucked into the pump to a final pressure of 10 mbar.

The mass of the sample after degassing is used for the calculation. For data analysis the NovaWin 11.04 Software is used. A multi-point analysis with 5 measuring points is performed and the resulting total specific surface area ($BET_{total}$) given in $m^2$/g. The dead volume of each sample cell is determined once prior the measurement using Helium gas (He 4.6, humidity 30 ppmv). The glass cuvettes are cooled to 77 K using a liquid nitrogen bath. For the adsorptive, $N_2$ 4.0 with a molecular cross-sectional area of 0.162 $nm^2$ at 77 K is used for the calculation.

The empirical t-plot methodology is used according to ISO15901-3:2007 to discriminate between contributions from micropores and remaining porosity at relative pressures of more than 0.1 (i.e. mesoporosity, macroporosity and external surface area contributions) and to calculate the micropore surface ($BET_{micro}$) and micropore volume. The low-pressure isotherm data points up to a cut-off $p/p_0$, typically up to 0.1 $p/p_0$ are selected to determine the linear section of the t-plot. Data point selection is validated by obtaining a positive C constant. The micropore volume is determined from the ordinate intercept. The micropore specific surface area ($BET_{micro}$) can be calculated from the slope of the t-plot.

Skeletal Density (Also Referred to as Material Density or Backbone Density)

The skeletal density measurements were performed according to DIN 66137-2. Between 0.49 g and 0.51 g of the powder sample were weighed in the sample cell and dried at 200° C. under vacuum for 1 h prior to the measurement. The mass after drying was used for the calculation. A Pycnomatic ATC Helium Pycnometer from Thermo Fisher Scientific, Inc. was used for the measurement, employing the "small" sample volume and the "small" reference volume. The pycnometer is calibrated monthly using the "extra small" sphere with a well-known volume of around 3 $cm^3$. Measurements were performed using Helium with a purity of 4.6, at a temperature of 20.0° C. and a gas pressure of approx. 2 bars, according to the DIN standard.

Thermal Gravimetric Analysis (TGA)

The thermal gravimetric analysis was performed on the Netzsch TG 209F1 Libra thermal analyzer with Netzsch *Proteus* software. The TG209 standard sample holder and the standard type K thermocouple for sample temperature measurement were used. The typical initial sample mass was around 15-30 mg. No preconditioning steps were performed prior to the measurement.

The mass of the sample, in an $Al_2O_3$ crucible, is recorded as the temperature in the measuring chamber is increased from 25° C. to 1000° C. at a heating rate of 5° C./min in an argon atmosphere (purity 5.0) at a flow of 20 $cm^3$/min.

In order to correct for the change in buoyancy during the experiment, the apparent mass of an $Al_2O_3$ crucible filled with a similar volume of inert $Al_2O_3$ powder is recorded separately under comparable conditions, and is subtracted from the measured signal.

The collected data is plot as the measured remaining mass percent, determined by [{(sample mass at temperature T–apparent mass from buoyancy at temperature T)/initial sample mass}×100] displayed in percent [%] (on the primary y-axis) and the sample temperature T from the thermocouple (on the secondary y-axis) as a function of time or alternatively the plots can have the temperature directly as the x-axis.

Oxygen Content on the Surface from XPS

To obtain the oxygen content on the surface of the material, an X-ray Photoelectron Spectrometer (XPS) machine PHI-5800 ESCA from the company Physical Electronics was used. The sample of some 10 mg amount was prepared by tapping the powder material onto a ring powder sample holder with diameter of 1.5 cm. Non-monochromatic Mg K alpha radiation with an energy of 1253.6 eV was used, and the spectrum was obtained for photoelectron energies from 0 to 1200 eV. The analyzed area was 0.5×0.5 $mm^2$. All other machine parameters were set to the standard values. The spectrum was calibrated by the carbon 1s peak and fit using the software Multipak 9.6.1. The atomic percentage of oxygen is derived from the fit of the (O1s peak) in the obtained spectrum.

Particle Size

The $D_{50}$ value of the particle size distribution characterizes the particle size not reached by 50% of the cumulative particle volume (median value of the particle size).

Particle sizes of less than 315 µm and corresponding size distributions were determined by laser diffraction on a dispersed specimen in accordance with ISO 13320. The measuring instrument used was a Mastersizer 3000 from Malvern, equipped with a He—Ne laser, a blue LED and a wet dispersion unit for measurements at ambient temperature (23° C.). The $D_{50}$ value of the particle size distribution were determined with the aid of the 21 CFR device software with a form factor of 1.

Particle sizes of more than 315 µm and corresponding size distributions were determined by sieve analysis using an "Air Jet RHEWUM LPS 200 MC" sieving device (RHEWUM GmbH).

SHORT DESCRIPTION OF THE FIGURES

The invention is now further elucidated with reference to the figures. The figures and figure descriptions are exemplary and are not to be considered as limiting the scope of the invention.

EXAMPLES

Figure 1:
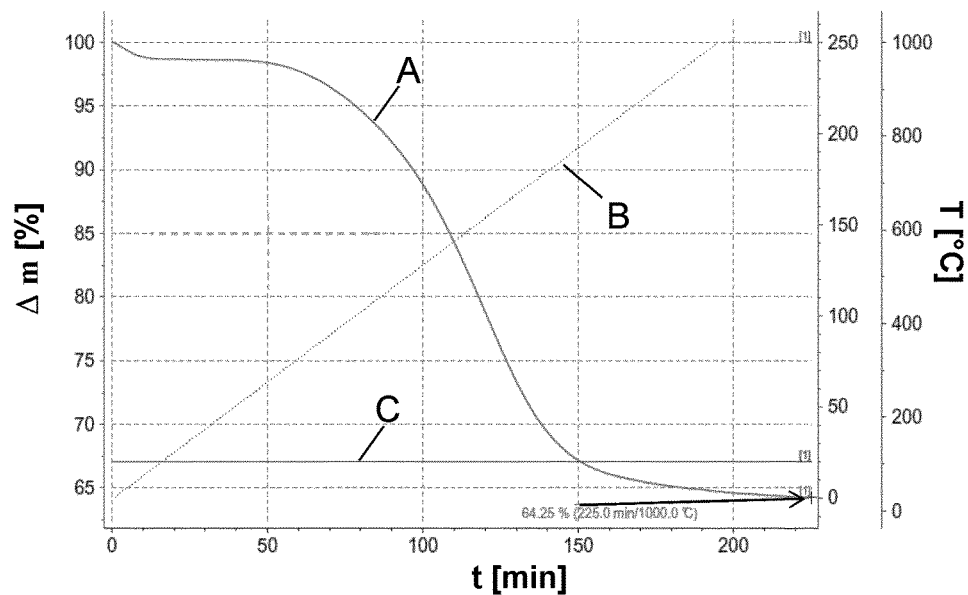
FIG. 1 shows a diagram of a thermal gravimetric analysis of a sample.

In the preferred embodiment the porous carbon material is produced by combining an aqueous resorcinol-formaldehyde resin (Novolac resin) or solid pellets of resorcinol-formaldehyde/phenolic-formaldehyde resin (Novolac types) and an amphiphilic molecule (either a block copolymer or a surfactant or a (non-ionic) emulsifier or a combination of amphiphilic molecules). The components are mixed to obtain a homogenous precursor material and filled into a crucible. The crucibles are put into an oven for heat treatment.

The heat treatment of this is performed in one-step in a nitrogen atmosphere by heating from room temperature to a higher temperature in the range from 300 to 600° C. The heating program is as follows:

From 25° C. to 250° C. with 1K/m in, hold at 250° C. for 60 min, from 250 to 400° C., with 0.5K/min, hold at 400° C. for 60 min, then (in cases where 400° C. is not the final treatment temperature) heating up to the final temperature with 1 K/min and a 30 or 60 minute hold at the final temperature. The thus obtained porous carbonaceous material is cooled down, removed from the oven, and mechanical crushed/milled to the desired particle size.

Table 1 lists the tested recipes and the conditions of the heat treatment.

TABLE 1

| Recipe No | Carbon source | Amphiphilic species | Weight ratio Carbon source/ Amphiphile | Heat Treatment Final temperature (° C.)/ Dwell time (min) |
| --- | --- | --- | --- | --- |
| 1 | Liquid Askofen 779 W 50 | Genapol PF20 | 5:3 | 400/60 |
| 2 | Pellets Alnovol PN320 | Synperonic L62 | 5:9 | 500/60 |
| 3 | Pellets Penacolite B-16S | Genapol X-080 | 5:9 | 500/30 |
| 4 | Liquid Askofen 779 W 50 | Genapol PF20 | 5:3 | 600/30 |
| 5 | Liquid Askofen 779 W 50 | Genapol PF20 | 5:3 | 500/30 |
| 6 | Tanex 20 | Synperonic F127 | 1:1 | 500/30 |

The 'weight ratio' indicated in the fourth column refers to the ratio of the total masses of the respective substances. The 779 W 50 Askofen resin, for example, is an aqueous resorcinol-formaldehyde resin of the Novolac type. and contains 50 wt. % solid resin and 50 wt. % liquid phase. Therefore, 5 parts by weight of this substance correspond to 2.5 parts by weight of the resin.

A multiple of experiments was made for each recipe to see the reproducibility of the results.

Comparative Example According U.S. Pat. No. 8,227,518 B2

Mixture of 100 g Askofen 779 W 50 and 60 g Ethylene glycol; heat treated to 500° C. under nitrogen atmosphere. Instead of using an amphiphilic species as pore generating agent, the non-amphiphilic molecule ethylene glycol (CAS: 107-21-1) was used.

Commercial sources for the materials employed are presented in Table 2.

TABLE 2

| Product name | Material type |
| --- | --- |
| Genapol ® PF20 | Amphiphilic molecule |
| Genapol ® X-080 | Amphiphilic molecule |
| Synperonic ™ PE/L62 | Amphiphilic molecule |
| Synperonic ™ PE/F127 | Amphiphilic molecule |
| Alnovol ® PN 320 | Phenolic-formaldehyde resins of the Novolac type |
| Penacolite B-16S | Resorcinol-Formaldehyde Novolac resin |
| ASKOFEN 779 W 50 | Aqueous resorcinol-formaldehyde resin of the Novolac type (50% solids) |
| Tannic Acid Tanex 20 | Hydrolysable tannic acid |
| Ethylene Glycol (CAS: 107-21-1) | Ethylene glycol |

The diagram of FIG. 1 show results of a thermal gravimetric analysis in argon up to 1000° C. of a carbonaceous material produced according to recipe 1 (thermal treatment at 400° C.). The lost in weight Δm (in %) of the sample is plotted on the primary ordinate as a function of the heating time t (in min). The temperature in the measuring chamber is plotted on the secondary ordinate axis and shows the constant heating rate (5° C./min) until the end temperature of 1000° C. is reached following which an isotherm of 30 minutes is held.

Curve A in FIG. 1 shows the mass loss of the sample, curve B shows the heating temperature and curve C the mass flow of argon flushing. Accordingly, the porous carbonaceous material loses at most about 10% of its initial weight upon treatment up to 500° C. At higher temperatures a remarkable loss of weight occurs showing the low temperature stability of the material. This can be explained by a continuing carbonization process of the porous carbonaceous material. On the other hand, the low stability of the porous carbonaceous material allows for faster secondary temperature treatments.

Figure 2:
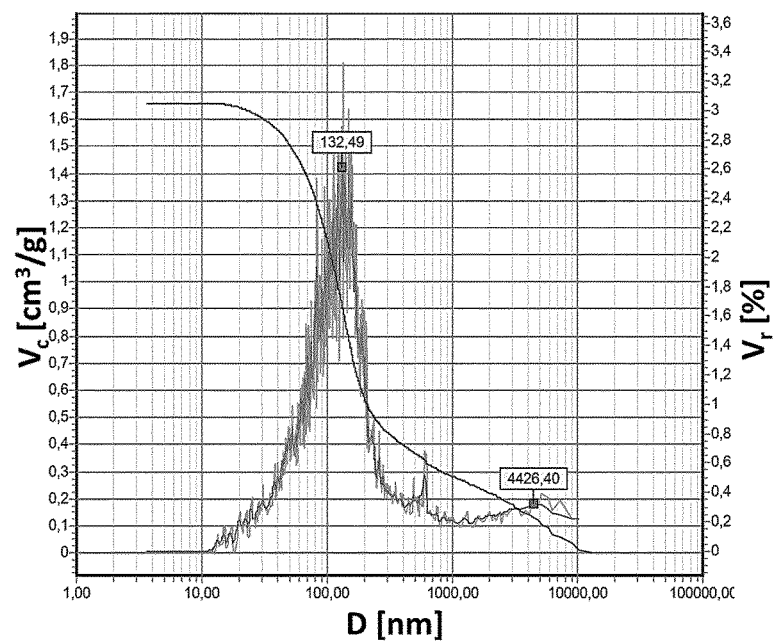
FIG. 2 shows a diagram of the pore size distribution of a first sample.
Figure 3:
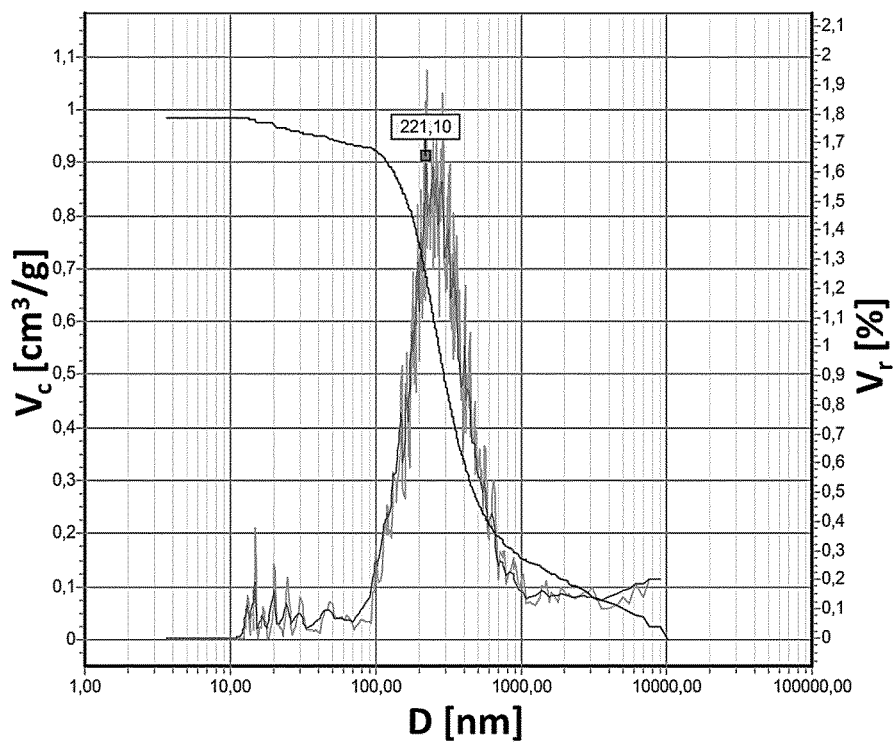
FIG. 3 shows a diagram of the pore size distribution of second sample.
Figure 4:
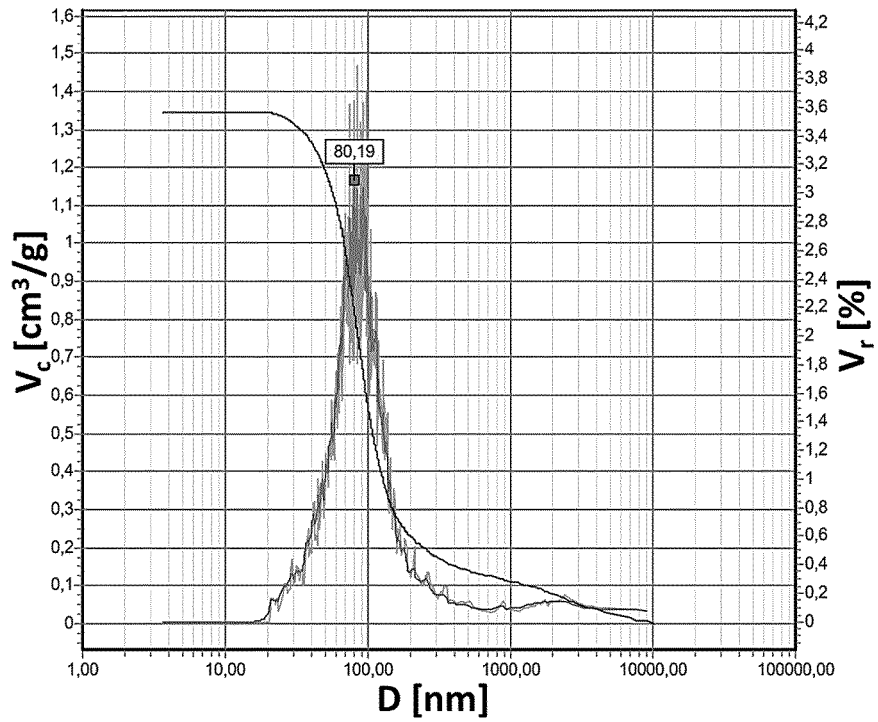
FIG. 4 shows a diagram of the pore size distribution of third sample.
Figure 5:
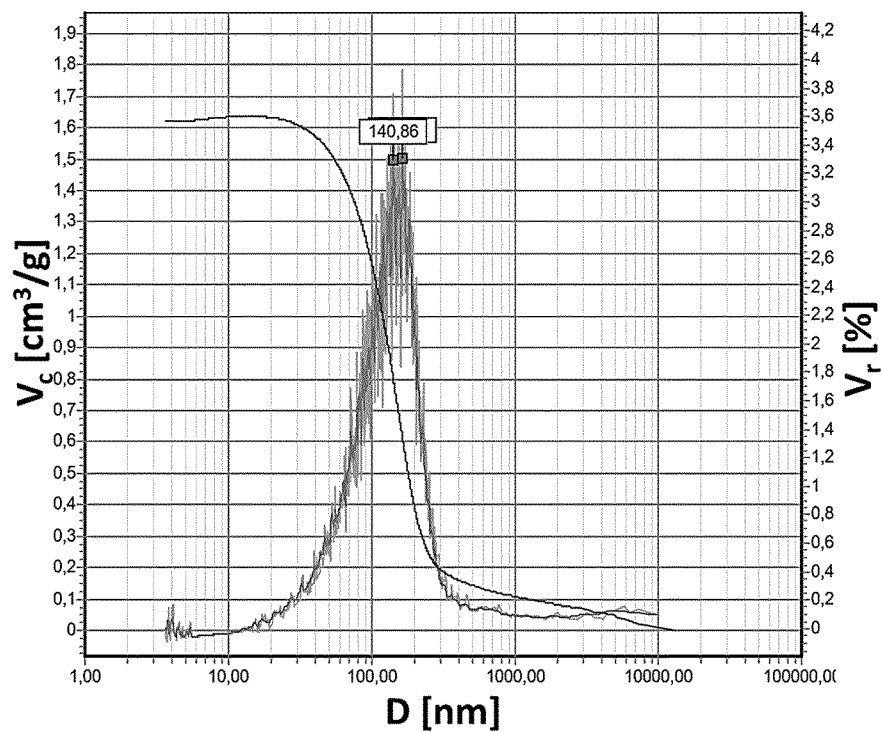
FIG. 5 shows a diagram of the pore size distribution of a fourth sample.
Figure 6:
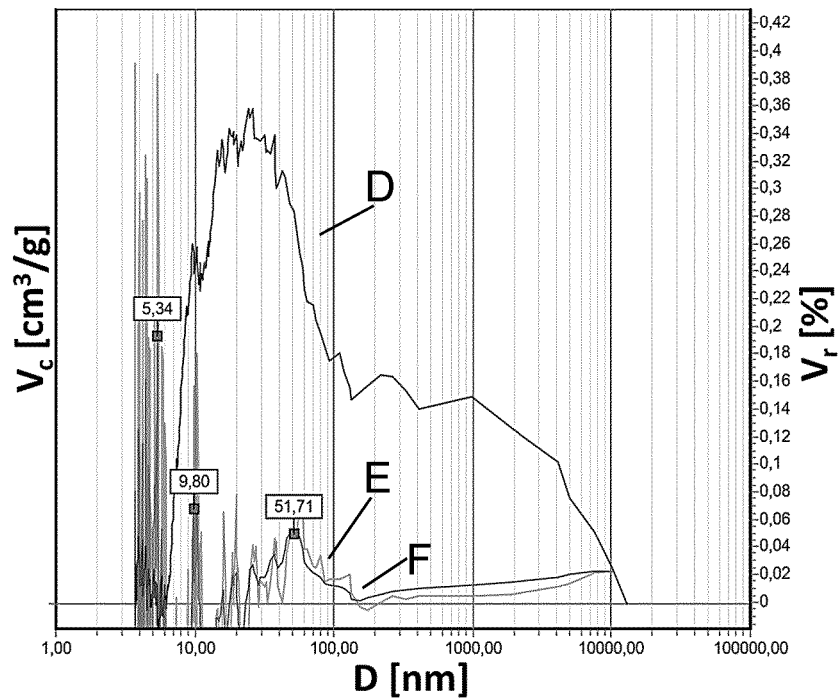
FIG. 6 shows a diagram with the pore size distribution of a comparative example

The diagrams of FIGS. 2 to 6 show the pore size distribution of the porous carbonaceous materials (FIG. 2 for sample 1; FIG. 3 for sample 2; FIG. 4 for sample 3 and FIG. 5 for sample 4; FIG. 6 for the comparative example according U.S. Pat. No. 8,227,518 B2).

The cumulative pore volume $V_c$ in [cm$^3$/g] is plotted on the left ordinate and the derivative dV/d(log D) on the right ordinate against the pore diameter D in [nm]. It can be seen that all samples according to the invention have a unimodal pore size distribution with a maximum of the pore size in the macropore range of about 50 nm to 280 nm. There are also some larger pores with D values of up to about 10,000 nm, which are interpreted as interparticle pores and which do not belong to the pore structure of the particles.

In contrast to this, the resulting carbonaceous material of the comparative example does not exhibit a suitable porosity in the desired range as shown in FIG. 6. The pore size distribution shows a small pore volume of about 0.002 cm$^3$/g, i.e. the material is non-porous. Curve D in the figure shows the cumulative pore volume, then two curves E and F show the pore size derivative as a function of pore size (curve F is a smoothed curve of the measured data points). These are all obtained in one measurement on one material.

Table 3 lists the carbonaceous material properties obtained from Nitrogen adsorption, Hg Porosimetry, and Helium Pycnometry

TABLE 3

| Recipe No. | BET$_{Micropore}$ (m$^2$/g) | BET$_{Total}$ (m$^2$/g) | Modal Pore Size (nm) | Pore Volume (cc/g) | Skeletal Density (g/cc) |
|---|---|---|---|---|---|
| 1 | 31 | 177 | 132 | 1.65 | 1.46 |
| 2 | 440 | 583 | 221 | 0.99 | 1.39 |
| 3 | 392 | 575 | 80 | 1.3 | 1.34 |
| 4 | 508 | 639 | 141 | 1.6 | 1.51 |

Figure 7:
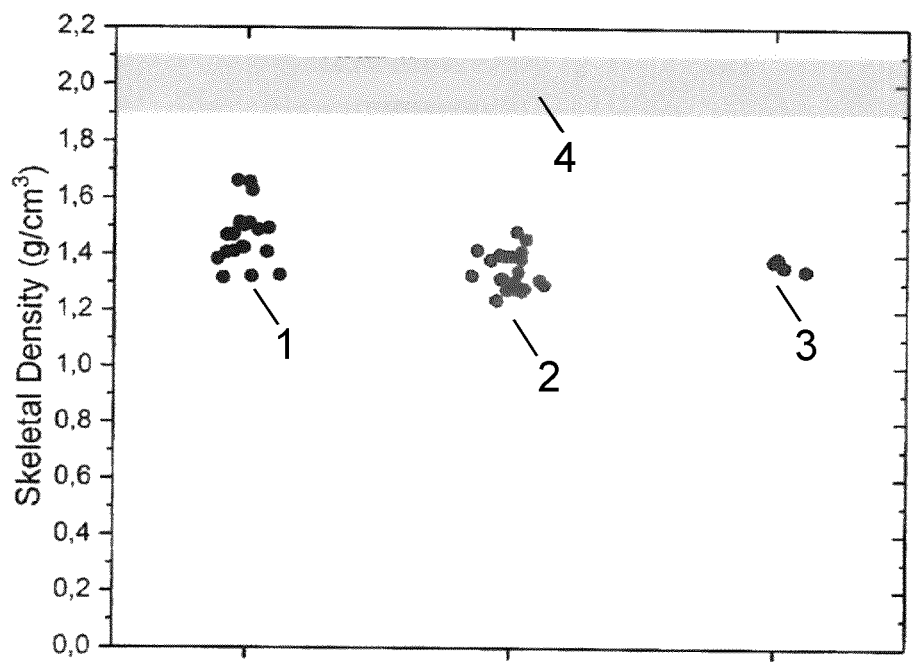
FIG. 7 shows a diagram of skeletal densities form several samples.

Depending on the individual type and ratio of the respective precursors used for the synthesis of the carbonaceous material, skeletal densities between 1.3 g/cm$^3$ and up to 1.7 g/cm$^3$ can be achieved. This is illustrated in FIG. 7. The distribution on x-axis is simply a scatter to show the individual data points. The grouping corresponds to a class of materials. The group of points designated by reference sign "1" is based on 20 measurements with the carbon source "Askofen 779 W 50". The calculated mean value of the skeletal density is 1.47 g/cm$^3$. The group of point "2" is based on 23 measurements with the carbon source "Alnovol PN320". The calculated mean value of the skeletal density is 1.34 g/cm$^3$. The group of points "3" is based on 4 measurements with the carbon source "Penacolite B-16S". The calculated mean value of the skeletal density is 1.37 g/cm$^3$. The grey-colored band "4" corresponds to skeletal densities values measured for precursor materials that have been treated at a high temperature of 900° C. The values there are given for the skeletal density range of the whole 47 samples (not the mean of values).

Table 4 lists material additional properties obtained from Nitrogen adsorption, Hg porosimetry, helium pycnometry, thermogravimetry and x-ray photoelectron spectroscopy for sample Nos. 4 and 5.

TABLE 4

| Recipe | Mass loss (%) | Oxygen content on surface (in at.-%) |
|---|---|---|
| 1 | 35 | 16.3 |
| 4 | 12 | 5.1 |

In column "Mass loss" the mass loss is listed when the porous carbonaceous material was heated to 1000° C. under inert gas.

The oxygen content on the surface is a measure of the specific surface area of the material. The oxygen content is measured using the XPS method.

As it is shown in Tables 3 and 4, the macroporosity in the carbonaceous material is already established at a final synthesis temperature as low as 400° C. and does not change significantly with increasing the temperature to 600° C. (Comparing Recipe 1 and 4). The main difference with increasing the final synthesis temperature to 600° C. is an increase in the specific surface area, and conversely a decrease in the oxygen content on the surface. The properties of the carbonaceous material can therefore be tuned depending on the desired specifications of the material. Furthermore, in dependence on the temperature at which the materials are firstly obtained, the mass loss upon heating even further and up to 1000° C. under inert gas atmosphere, can be influenced. This allows for an addition adjustment of the material properties depending on the desired post-processing after the synthesis, i.e. it allows for example to reduce the off-gassing from the material during such a posttreatment depending on the synthesis temperature (e.g. 400° C. or 600° C.). This means that for example by using a synthesis temperature of 600° C., a higher throughput can be achieved during a post-treatment step than compared to a material that was obtained at 400° C.

Table 5 lists additional material properties obtained from Nitrogen Adsorption, Hg porosimetry, helium pycnometry and thermogravimetry for sample of recipe No 6.

TABLE 5

| Recipe | BET$_{Micro}$ (m$^2$/g) | BET$_{Total}$ (m$^2$/g) | Modal Pore Diameter (nm) | Pore Volume (cc/g) | Skeletal Density (g/cc) | Mass Loss (%) | Oxygen content on surface (at.-%) |
|---|---|---|---|---|---|---|---|
| 6 | 325 | 407 | 114 | 1.4 | 1.62 | 14 | 5.7 |

As it is shown in Table 5, the macroporosity in the carbonaceous material can also be achieve with a hydrolysable tannic acid carbon precursor. The properties of the carbonaceous material can therefore be tuned also via the choice of carbon source depending on the desired specifications of the material.

Also, the carbonaceous materials described herein do not conduct electrical current, i.e. they are electrical insulators. Such porous insulators are well suited to act as separators for example in electrochemical energy storage devices. Also, these materials could be used as thermal insulators at a low ambient pressure or under vacuum.

The precursor material mixture typically contains a novolac resin and an amphiphilic surfactant. An example for the novolac resin is Alnovol PN320 (Allnex) and for the surfactant Genapol PF20 (Clariant) or Synperonic PE/L64 (Croda). The ratio of the resin to surfactant is in general 5:(1.5-9).

Figure 8:
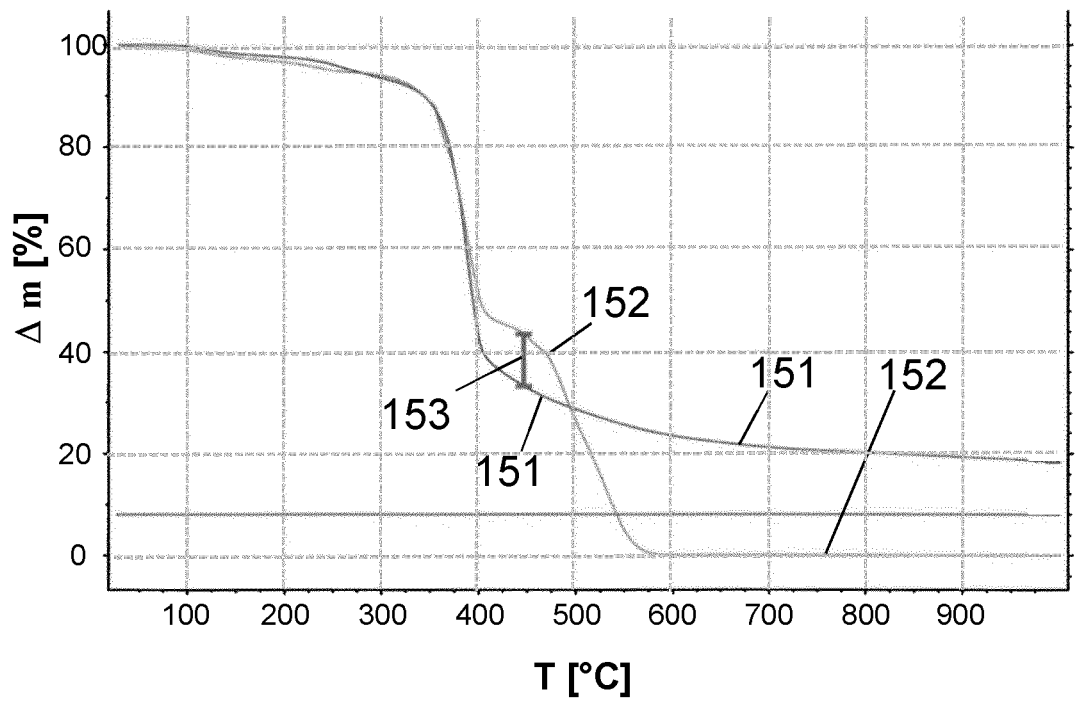
FIG. 8 shows the result of a thermogravimetric analysis (TGA) of a specific precursor material heated up to 1000° C. in both argon and in synthetic air.

FIG. 8 shows the result of a thermogravimetric analysis (TGA) carried out with a mixture of Alnovol PN320 with the Genapor PF20 Synperonic PE/L64 with the ratio of 5:5, where said mixture was separately heated up to 1000° C. in both argon (curve 81) and synthetic air (curve 82) atmospheres. Similar as in FIG. 1, the remaining mass compared to the original sample mass Δm (in %) of the sample is plotted on the ordinate as a function of the heating temperature T (in ° C.). The heating temperature is a function of the heating rate which is 3° C./min until a temperature of 600° C. is reached and 5° C./min until the end temperature of 1000° C. Until about 400° C. the TGA curves 81, 82 of the samples heated in different atmospheres have rather similar profiles. At 400° C. the argon pyrolyzed sample (81) shows a larger mass loss and its slope decreases afterwards. The air pyrolyzed sample (82) has a plateau in the temperature range from about 400 to 450° C., where the mass loss of carbon is about 10 wt. % lower than the mass loss of the argon pyrolyzed sample (81). The mass loss however strongly increases when oxidation takes place at temperatures higher than 450° C. The difference in the carbon yields at 450° C. is indicated by the distance bar 83.

Similar thermogravimetric analysis results were revealed for a precursor material made from Alnovol PN445 and Genapol PF20 (5:5) mixture. At a temperature of 450° C., the mass loss of the sample crosslinked in argon atmosphere was almost 15 wt. % larger compared to the sample crosslinked in synthetic air.

Based on these thermogravimetric results, an experiment was designed to prove that the increase of the carbon yield (the reduction of the carbon mass loss) during the pyrolysis can be transferred to the synthesis of the porous carbon material by the process of the invention. A mixture of Alnovor PN320 and Genapor PF20 with the ratio of 5:5 was crosslinked and pyrolyzed up to 600° C. with the following heating ramp profile: 20-350° C.: on average 0.5° C./min→350-450° C.: 1° C./min→450-600° C.: 2° C./min. At a temperature of 450° C. the decomposition of the amphiphile is sufficiently complete and the atmosphere is changed from containing the oxidizing agent to one with inert gas only. This temperature (450° C.) is at the same time the maximal temperature of the oxidation phase in which the precursor material is heated in an atmosphere containing an oxidizing agent and the "first temperature" of the low temperature treatment.

In the first trial the mixture was pyrolyzed in nitrogen atmosphere. In the second trial the mixture was heated in an open retort in order to ensure an atmosphere containing an oxidizing agent (air) during pyrolysis until 450° C. As soon as that temperature was reached, the retort was closed, and the nitrogen flow was turned on in order to protect the carbonaceous material from further oxidation by air at higher temperatures (450-600° C.). Table 6 shows a comparison of the yields of the porous carbon material after the pyrolysis in nitrogen and in air (until 450° C.).

TABLE 6

| Atmosphere | Precursor mixture | Yield at 600° C. in % | Yield at 900° C. in % |
|---|---|---|---|
| Nitrogen | Alnovol ® PN320 Genapol ® PF20 | 30.3 | 26.3 |
| Air until 450° C. (and afterwards N$_2$) | Alnovol ® PN320 Genapol ® PF20 | 32.7 | 29.7 |

The sample treated in nitrogen has a yield of 30.3 wt. % at 600° C., while the air crosslinked sample has a higher yield of 32.7 wt. %. The statistical error of the yield is typically 0.5 wt. %. In fact, the yield of the carbonized air crosslinked sample is 3.4 wt. % larger compared to the nitrogen crosslinked sample. This improvement is even larger than the yield gain of 2.4 wt. % found at 600° C. This implies that oxygen stabilizes the polymeric network and this improvement can be preserved. In this first experiment the air was replaced by nitrogen at a temperature of 470° C. By other experiments it could be shown that even a higher carbon yield might be obtained by process optimization, e.g. by switching to an inert atmosphere at a temperature of 400° C. and lower.

The crosslinking and pyrolysis of the precursor material mixtures result in a macroporous carbon with a cumulative pore volume above 0.4 cm$^3$/g and with a modal pore size in the range between 50-280 nm.

The invention claimed is:

1. A process for the preparation of a porous carbonaceous material comprising:
   a) providing at least one carbon source and at least one amphiphilic species,
   b) combining at least the carbon source and the amphiphilic species to obtain a precursor material,
   c) heating the precursor material to a temperature in the range between 350° C. and 550° C. for at least 15 min so as to obtain the porous carbonaceous material, and
   d) cooling the porous carbonaceous material having a modal pore size and a pore volume and a skeleton density
   e) comminuting the porous carbonaceous material so as to obtain crushed porous carbonaceous material particles, and
   f) heating the crushed porous carbonaceous material particles to a temperature in the range from 700-1500° C.

2. The process according to claim 1, wherein during heating step c) the precursor material is heated to a temperature in the range between 450 and 500° C., for at least 15 min.

3. The process according to claim 1, wherein the crushed porous carbonaceous material has a medium particles size (D$_{50}$ value) of less than 10 mm.

4. The process according to claim 1, characterized in that the heating of the precursor material in heating step c) comprises an oxidation phase in which the precursor material is heated in an oxidizing atmosphere.

5. The process according to claim 4, characterized in that the oxidizing atmosphere during heating the precursor material during the oxidation phase is an oxygen-containing atmosphere with an oxygen content of less than 25% by volume.

6. The process according to claim 4, characterized in that the heating of the precursor material during the oxidation phase is carried out in a temperature range between 150° C. and 470° C.

7. The process according to claim 4, characterized in that the oxidation phase has a duration in the range of 60 to 360 minutes.

8. The process according to claim 1, wherein the carbon source is selected from the group consisting of formaldehyde resins, hydrolysable tannic acid, lignin, and cellulose resins.

9. The process according to claim 1, wherein the at least one amphiphilic species is selected from the group consisting of block co-polymers and/or surfactants.

10. The process according to claim 9, wherein the block-copolymer is selected from the group consisting of triblock copolymers with the structure polyoxyethylene-polyoxypropylene-polyoxyethylene or polyoxypropylene-polyoxyethylene-polyoxypropylene, emulsifiers, surfactants and other modified polyethylene glycols.

11. The process according to claim 9, wherein the at least one amphiphilic species comprises an amphiphilic compound, the amphiphilic compound comprising two or more adjacent ethylene oxide based repeating units.

12. The process according to claim 1, wherein the crushed porous carbonaceous material has a medium particles size ($D_{50}$ value) of less than 5 mm.

13. The process according to claim 1, wherein the crushed porous carbonaceous material has a medium particles size ($D_{50}$ value) of less than 3 mm.

14. A porous carbonaceous material obtainable by the process according to claim 1 having a skeletal density in the range from 1.2 $g/cm^3$ to 1.8 $g/cm^3$ and further comprising pores including open interconnected pores.

15. A porous carbonaceous material according to claim 14, wherein the pores have a modal pore size is in the range from 50 to 280 nm.

16. A porous carbonaceous material according to claim 14, wherein the pores have a monomodal pore size distribution.

17. A porous carbonaceous material according to claim 14, wherein the porous carbon material is present as a monolithic body or as a powder.

18. A porous carbonaceous material according to claim 14, having a skeletal density in the range from 1.3 $g/cm^3$ to 1.7 $g/cm^3$.

19. A catalyst comprising a catalyst support having a surface area on which metal particles are distributed, wherein the catalyst support is made from a porous carbonaceous material according to claim 14.

* * * * *